United States Patent Office 2,875,076
Patented Feb. 24, 1959

2,875,076
NACREOUS GRAPHITE PIGMENT

Lawrence Suchow, New York, N. Y., assignor to Francis Earle Laboratories, Inc., Peekskill, N. Y., a corporation of New York No Drawing. Application February 7, 1957
Serial No. 638,685

8 Claims. (Cl. 106—148)

This invention relates to nacreous graphite pigments and to a method for preparing the same.

Transparent substances which have a high index of refraction and are in the form of thin, plate-like crystals are commonly used to produce a nacreous, mother-of-pearl effect. The optical effect can be achieved either by coating the surface of an object with a vehicle containing such crystals or by incorporating the crystals within light-transmitting substances, in which case the optical effect becomes an integral part of the object.

Integral mother-of-pearl effects can be produced with many transparent or translucent substances by incorporation of the nacreous material within the substance itself. For example, simulated mother-of-pearl knife handles and fountain pen barrels can be made by incorporating a nacreous pigment in a plastic, such as cellulose acetate, which is then molded into the appropriate shape. Simulated pearl buttons are made from discs which are cut from acrylic or polyester sheets containing oriented pearly pigment; the nacreous pigment is suspended in the appropriate polymerizable resin, which is then cast to form a solid sheet in which the nacreous effect is incorporated. It is important in this application that the plate-like crystals have the proper orientation at the time of gelation.

To produce pearly luster in surface coatings, nacreous pigments are suspended in a light-transmitting, film-forming vehicle which is applied to a surface so that the thin, plate-like crystals of the pigment lie parallel to one another and generally perpendicular to incident light. The nacre is caused by simultaneous reflection of light from the many parallel surfaces at different depths, which produces a velvety pearl-like luster rather than the metallic mirror-like luster characteristic of light reflected from a single surface.

Pearl essence, which is a guanine composition derived from fish, and lead hydrogen phosphate are examples of effective nacreous pigments.

A nacreous or pseudo-nacreous effect is also obtained when the pigment consists of opaque, plate-like particles. In this case, the effect is due entirely to reflection from the top layer of particles, and the three dimensional effect obtained is due to variation in the height of the top layer of pigment particles in the film, coating or plastic. Aluminum flake is an example of this type of pigment. The pigments of the present invention also fall within this category.

In pigments of this type, it becomes a problem to produce lustrous color effects which have high heat stability. Such effects are not generally attainable through the use of dyes which are further limited as to the shade or tone of a given color which may be produced.

Moreover, it has heretofore not been possible through the use of dyes to produce a pure black, lustrous nacreous effect.

Accordingly, it is an object of the present invention to provide a novel composition which will produce a black lustrous nacre.

Another object is to provide a method for economically and efficiently preparing such a composition.

A further object of this invention is to provide novel articles of manufacture in which are incorporated nacreous graphite pigments.

These and other objects of this invention will become apparent from the following description:

It has been found that nacreous pigments of finely divided graphite particles produce an excellent pure black nacre with very good lustre. Such pigments are further found to have high heat stability and are prepared by grinding graphite to the desired fineness in a liquid vehicle.

The nacreous graphite may be prepared by milling graphite to a desired particle size and configuration hereinafter disclosed.

In a second method, plate-like crystals of nacreous graphite are prepared by milling graphite suspended in a carrier such as a glycol, glycol ether, lower alkyl alcohol (e. g. isopropanol), petroleum distillates or even water, preferably in the presence of a soap, detergent or other emulsifying or wetting agent. The suspension of graphite particles, initially present in the carrier in amounts between 20 and 80 percent, by weight, is diluted, then centrifuged or filtered, and the recovered crystals are suitably classified and incorporated into a suitable solvent lacquer or plastic which will produce the desired nacreous effect.

The graphite crystals of the present invention which produced the desired black, lustrous nacreous effect are in the form of irregular opaque plates 1 to 50 microns in diameter, with a preferred average size of about 8 microns. This dimension is measured in the plane of the flat, plate-like crystal. The thickness of such crystals would be of the order of about 0.1 to 1 micron.

Example

A dispersion of finely divided graphite was prepared from powdered graphite of about 200 mesh size by milling the graphite in ethylene glycol monoethyl ether (Cellosolve) containing 1 percent sodium lauryl sulfate as a wetting agent. The solids in the resulting slurry were separated therefrom by sedimentation and then again diluted in ethylene glycol monoethyl ether to a solids content of from 10 to 20 percent. This supsension was then centrifuged, the light-weight material remaining in the suspension being subsequently discarded. The solids resulting from the centrifugation had a pure black lustrous appearance and were of a plate-like configuration. The diameter of the particles was between about 1 and 50 microns, the average being 8 microns. The thickness was from 0.1 to 1 micron.

The crystals produced by the procedure outlined in the above example, when suspended in water or in an organic solvent, produce on stirring, the silky or pearly appearance which is typical of nacreous crystals. The motion of the liquid causes the crystals to be oriented with respect to each other, and luster is produced as light is reflected from numerous crystal faces.

The form in which the nacreous graphite pigment is commonly prepared is that of a paste which contains as the vehicle thereof, a light-transmitting, preferably clear liquid which is compatible with lacquers, resins, and plastics. For certain applications it is desirable to use the nacreous pigment in the form of a dry powder, although drying often causes a partial loss in luster through agglomeration of individual crystal platelets. Other applications utilize the nacreous crystals in aqueous suspension.

For surface coating, the graphite nacreous pigments of the present invention can be suspended in a cellulose nitrate lacquer. However, there may be substituted almost any clear lacquer formula as the vehicle for either of the pigments. Generally a translucent or transparent plastic material such as cellulose acetate, the alkyd resins, the vinyl resins, as well as the acrylic acid ester resins are found to be quite useful. A typical paste composition useful for stock material to be diluted to a useful concentration level is the following:

1 part (by weight) graphite
2 parts (by weight) cellulose nitrate lacquer

The lacquer may have a formulation such as the following:

| | Percent |
|---|---|
| Cellulose nitrate (15–20 seconds) | 8 |
| Ethanol | 3–20 |
| Amyl acetate | 89–72 |

The water-washed crystals which have been described above can be made compatible with a lacquer of this type by being washed with a suitable water-miscible organic solvent, such as ethanol.

When used to make simulated pearls by the coating of alabaster glass or plastic beads, the lacquer paste containing one-third nacreous pigment is further diluted with a clear cellulose nitrate lacquer of the appropriate viscosity. Such lacquers, suitable for coating objects by dipping, spraying, etc., for best results should contain from 0.5 to 5 percent of the graphite crystals.

The solvent, instead of containing primarily amyl acetate as indicated in the above example, may comprise butyl acetate, acetone, or other commonly used organic solvents.

For incorporation in a plastic, such as methyl methacrylate, it is convenient to disperse the nacreous graphite in a plasticizer rather than in a lacquer formulation. A suitable composition for this purpose is:

| | Percent |
|---|---|
| Nacreous graphite | 25.0 |
| Acetone | 20.0 |
| Dibutyl phthalate | 55.0 |

The pigment paste is blended with a plastic molding powder, such as methyl methacrylate, in such quantity as to yield a final concentration in the plastic of approximately one percent nacreous pigment. The plastic can be extruded into rods, injection molded into various shapes, etc.

For use in casein plastics, where the presence of organic solvents is not necessary, it is most convenient to prepare the nacreous pigment in the form of a paste in water. The desired quantity of this aqueous paste is then incorporated in the casein powder prior to processing. Generally the desired effects are obtained when the concentration of graphite is 0.5 to 5 percent of the weight of the casein.

The heat stability of the graphite also makes possible their use as nacreous pigments in transparent inorganic substances, such as glasses. The dry crystals may be dispersed in molten glass, and then oriented by the operations utilized in molding or blowing the glass.

In all instances referred to above the utilization of nacreous graphite produced a much more lustrous pure black pearly effect than could be obtained by dyeing white nacreous pigments.

In the foregoing the invention has been described only in connection with preferred embodiments thereof. Many variations and modifications of the principles of my invention within the scope of the description herein are obvious. Accordingly, it is preferred that this invention be bound not by the specific disclosure herein, but only by the appending claims.

I claim:
1. A nacreous pigment for producing a lustrous black effect, said effect being due to the presence therein of particles of finely-divided plate-like opaque, crystalline graphite, the graphite particles being in the range of 1 to 50 microns in diameter and having a thickness not greater than 1 micron.

2. The pigment of claim 1 in which the average diameter of the graphite particles is about 8 microns.

3. A nacreous composition having a pigment suspended therein for producing a lustrous black effect, said effect being due to the presence in said composition of particles of finely-divided, plate-like, opaque, crystalline graphite, the graphite particles being in the range of 1 to 50 microns in diameter and having a thickness not greater than 1 micron, the said graphite particles being suspended in a light-transmitting, liquid vehicle.

4. The composition of claim 3 in which the liquid vehicle is a mixture of solvent and plasticizer.

5. A nacreous composition having a pigment suspended therein for producing a lustrous, black effect, said effect being due to the presence in said composition of particles of finely-divided, plate-like, opaque, crystalline graphite, the graphite particles being in the range of 1 to 50 microns in diameter and having a thickness of the order of 0.1 to 1 micron, the said graphite particles being suspended in a light-transmitting organic lacquer.

6. A nacreous coating composition having a pigment suspended therein for producing a lustrous black effect, said effect being due to the presence in said composition of 0.5 to 5 percent of finely-divided, plate-like, opaque, crystalline graphite, the graphite particles being in the range of 1 to 50 microns in diameter and having a thickness of the order of 0.1 to 1 micron, the said graphite particles being suspended in a nitrocellulose lacquer.

7. A nacreous plastic molded article having a pigment suspended therein for producing a lustrous black effect, said effect being due to the presence in said composition of 0.5 to 5 percent of finely-divided, plate-like, opaque, crystalline graphite, the graphite particles being in the range of 1 to 50 microns in diameter and having a thickness of the order of 0.1 to 1 micron, the said graphite particles being suspended in a casein plastic.

8. The composition of claim 4 in which the solvent is acetone and the plasticizer is dibutyl phthalate.

References Cited in the file of this patent

UNITED STATES PATENTS

| 191,490 | Sweeney | May 29, 1877 |
| 692,102 | Bachrach | Jan. 28, 1902 |

OTHER REFERENCES

Porter: News Edition (Am. Chem. Soc.) 19, "Utility of Colloidal Graphite," pp. 577–578 (1941).